United States Patent Office 3,367,957
Patented Feb. 6, 1968

3,367,957
CYCLOPROPYL CARBINYL ISOTHIOCYANATE
Peter E. Newallis, Morris Plains, and Langley A. Spurlock, Montclair, N.J., assignors to Allied Chemical Corporation, New York, N.Y., a corporation of New York
No Drawing. Filed Apr. 1, 1965, Ser. No. 444,794
1 Claim. (Cl. 260—454)

ABSTRACT OF THE DISCLOSURE

The compound cyclopropyl carbinyl isothiocyanate which is useful as a nematocide.

---

This invention relates to cyclopropyl carbinyl isothiocyanate and to a process for preparing it. This compound is a new composition of matter and is useful as a nematocide.

Cyclopropyl carbinyl isothiocyanate has the structural formula

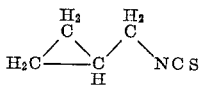

It is a water insoluble liquid boiling at 78°–79° C. at 20 mm. pressure.

According to our invention the new cyclopropyl carbinyl isothiocyanate is prepared from its isomer cyclopropyl carbinyl thiocyanate by heating it in a selected solvent to temperatures in the range between about 130° C. and about 170° C., preferably in the presence of an excess of the common ion SCN⁻ and in the presence or absence of a catalyst such as zinc chloride, boron trifluoride, or other Lewis acid catalysts whereby the thiocyanate (—SCN) group is isomerized to the isothiocyanate (—NCS) group according to the equation 1.
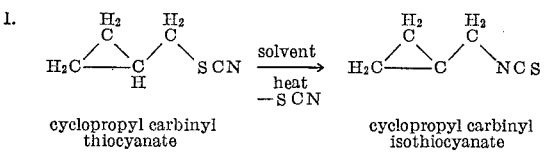

While the precise mechanism of the isomerization rearrangement is not entirely clear, it is believed that the isomerization proceeds through an initial isomerization of the cyclopropyl carbinyl thiocyanate into cyclopropyl carbinyl ion, $\triangle$—CH$_2$⁺, and thiocyanate ion, SCN⁻, and that these ions recombine in reverse association —NCS.

Isomerization takes place more or less rapidly, depending on temperature conditions, presence or absence of a common SCN⁻ ion and the presence or absence of a catalyst. Higher temperatures accelerate reaction rate, but care should be exercised not to decompose the solvent or the product isothiocyanate. The presence of excess SCN⁻ ion accelerates the reaction markedly. In the absence of such ion isomerization is extremely slow, the half life of the starting thiocyanate being about 2–3 days in the absence of common ion, whereas the presence of excess SCN⁻ ion decreases this half life to 17–24 hours and renders the reaction economically feasible. The common SCN⁻ ion may conveniently be supplied by the addition of an alkali thiocyanate such as potassium, sodium or lithium thiocyanate or the like.

Presence of a catalyst tends to increase the rate of reaction but changes the distribution of end products, reducing the yields of cyclopropyl carbinyl isothiocyanate as compared to that obtainable in the absence of catalyst. The cyclopropyl carbinyl thiocyanate starting material is a known compound and can be prepared from cyclopropyl carbinol by forming the p-toluene sulfonate ester and displacement of the ester by the thiocyanate ion as illustrated in the equations below:

(II) Preparation of cyclopropyl carbinol:

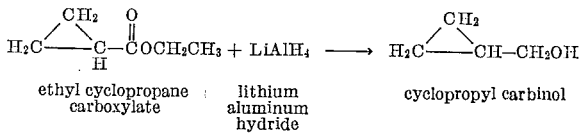

ethyl cyclopropane carboxylate    lithium aluminum hydride    cyclopropyl carbinol (III) Preparation of p-toluene sulfonate ester of cyclopropyl carbinol:

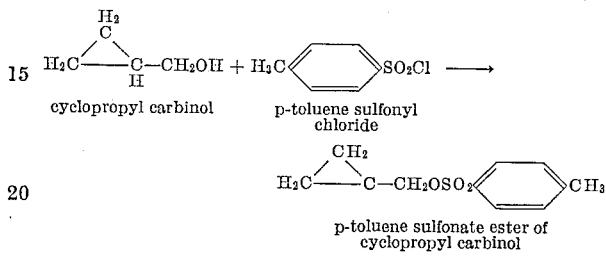

p-toluene sulfonate ester of cyclopropyl carbinol (IV) Preparation of cyclopropyl carbinyl thiocyanate:

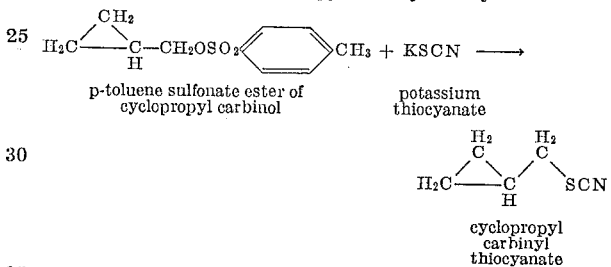

In preparing the cyclopropyl carbinyl isothiocyanate of our invention, the liquid cyclopropyl carbinyl thiocyanate is dissolved in a polar, aprotic liquid organic compound which contains in its structure, besides carbon and hydrogen, only one or more of the functional groups nitro (—NO$_2$), nitrile (—C≡N), or amido $\left(-C\begin{subarray}{l}\diagup\!\!\!\!O\\ \diagdown NR_2\end{subarray}\right)$ where R is an alkyl group preferably 1 to 2 carbon atoms. The polar liquid used is critical to the isomerization reaction, the more highly polar the liquid, the more nearly complete the conversion of the thiocyanate group to the isothiocyanate group. Suitable polar liquids are nitrobenzene, acetonitrile and dimethylformamide. On the other hand, dimethyl sulfoxide is unsatisfactory.

The proportion of polar liquid used as reaction medium is not unduly critical, but should be sufficient to dissolve the cyclopropyl carbinyl thiocyanate. Solutions having concentrations of between about 1% and about 50% by weight are satisfactory.

Catalysts of the Lewis acid type, i.e., metallic halides such as zinc chloride, boron trifluoride, cadmium iodide, and aluminum chloride, if present, tend to increase the rate of reaction, presumably by promoting ionization of the cyclopropyl carbinyl thiocyanate, but result in a decrease in the amount of cyclopropyl carbinyl isothiocyanate obtainable by promoting different types of recombinations of the ionized components, producing skeletal rearrangements into cyclobutyl thiocyanate and isothiocyanate ☐—SCN    and    ☐—NCS and allyl carbinyl thiocyanate and isothiocyanate

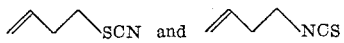

Accordingly, for best yields of cyclopropyl carbinyl isothiocyanate, we prefer to carry out the isomerization without the aid of a catalyst. If the catalyst is used, proportions between about 0.1 mole and about 1 mole per mole of cyclopropyl carbinyl thiocyanate are suitable.

The presence of additional thiocyanate $SCN^-$ ion in the reaction medium is highly desirable, and may be accomplished by the introduction of a small quantity of a soluble thiocyanate such as an alkali thiocyanate of, for example, between about 0.1 mole and about 10 moles per mole of cyclopropyl carbinyl thiocyanate, to adequately exert its accelerating effect on the isomerization.

The following specific examples further illustrate our invention.

Example 1

Five grams (0.44 mole) of cyclopropyl carbinyl thiocyanate was dissolved in 25 milliliters of acetonitrile in which 0.5 gram (0.005 mole) of potassium thiocyanate had been dissolved. The resulting solution was sealed in glass ampoules and heated at 140° C. for 113 hours. At this time a gas chromatographic analysis of an aliquot indicated the reaction to be 95% complete. The solution was poured into 150 milliliters of water and extracted with three 20-milliliter portions of pentane. The combined extracts were washed with two 50-milliliter portions of water, dried and concentrated yielding 4.1 grams of liquid product equivalent to a yield of 82%. Gas chromatographic analysis indicated the product to be a mixture predominating in cyclopropyl carbinyl isothiocyanate,

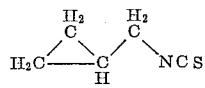

and having the approximate composition shown below:

| Component: | Percent |
|---|---|
| Cyclopropyl carbinyl isothiocyanate | 70 |
| Cyclopropyl carbinyl thiocyanate | 5 |
| Cyclobutyl thiocyanate | 12 |
| Cyclobutyl isothiocyanate | 5 |
| Allyl thiocyanate | 6 |
| Allyl isothiocyanate | 2 |
|  | 100 |

The cyclopropyl carbinyl isothiocyanate obtained above had a boiling point of 78–79° C. at 20 mm. pressure. Its infrared spectrogram showed a characteristic absorption peak at 2110 cm.$^{-1}$ indicative of the —NCS group and was completely lacking in a band at 2160 characteristic of the —SCN group.

Elemental analysis showed:

| Percent: | Theory | Found |
|---|---|---|
| C | 53.06 | 53.20 |
| H | 6.23 | 6.22 |
| N | 12.38 | 12.07 |
| S | 28.33 | 28.51 |

When the isomerization was carried out in a manner similar to that outlined above except that nitrobenzene and dimethyl formamide were separately substituted for the acetonitrile solvent, a similar distribution of isomers was obtained. However, reaction required about 200 hours for completion in the case of nitrobenzene and about 24–30 hours in the case of dimethylformamide.

When isomerization was carried out in the absence of a compound providing additional $SCN^-$ ion, a yield of only about 40% of cyclopropyl carbinyl isothiocyanate was obtained in 113 hours.

Example 2

Two and one-half grams (0.22 mole) of cyclopropyl carbinyl thiocyanate was dissolved in 25 milliliters of benzene in which 0.3 gram (.002 mole) of zinc chloride had been dissolved as catalyst. The resulting solution was heated to reflux for 6 hours, when a gas chromatographic analysis of an aliquot indicated the reaction to be 90% complete. The solution was then washed with two 25-milliliter portions of saturated sodium bicarbonate solution, dried and concentrated, producing 2.3 grams, 92% yield, of total product of which about 10% was cyclopropyl carbinyl isothiocyanate.

Example 3

The product prepared in Example 1 above and consisting predominantly of cyclopropyl carbinyl isothiocyanate was tested as a toxicant against nematodes (*Panagrellus redivivus*) by preparing an aqueous solution containing 1,000 parts per million of the isothiocyanate toxicant and immersing 100 nematodes in 5 cc. thereof. Mortality observations were made over a 4-day period at the end of which all the nematodes were dead.

While the above describes the preferred embodiments of the invention, it will be understood that departures can be made therefrom within the scope of the specification and claim.

We claim:

1. As a compound, cyclopropyl carbinyl isothiocyanate of the formula

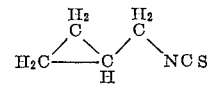

References Cited

UNITED STATES PATENTS 2,954,393    9/1960    Haimsohn et al. _____ 260—454
3,149,141    9/1964    Venerable et al. _____ 260—454

OTHER REFERENCES

Braun et al.: Chemical Abstracts, vol. 20, page 390 (1926).

CHARLES B. PARKER, *Primary Examiner.*

D. H. TORRENCE, *Assistant Examiner.*